United States Patent [19]

Fernandez

[11] Patent Number: 4,811,913

[45] Date of Patent: Mar. 14, 1989

[54] COMFORT MECHANISM WITH SLACK SET AND MEMORY

[75] Inventor: Angel Fernandez, Mount Clemens, Mich.

[73] Assignee: TRW Vehicle Safety Systems Inc., Lyndhurst, Ohio

[21] Appl. No.: 215,648

[22] Filed: Jul. 6, 1988

[51] Int. Cl.$^4$ .............................................. B60R 22/34
[52] U.S. Cl. .................................................. 242/107.6
[58] Field of Search .......................... 242/107.6, 107.7; 280/807, 808, 806; 297/475-480

[56] References Cited

U.S. PATENT DOCUMENTS

| | | | |
|---|---|---|---|
| 3,682,412 | 8/1972 | Kuszynski | 242/107.6 |
| 3,700,184 | 10/1972 | Francis | 242/107.6 |
| 3,771,742 | 11/1973 | Okada | 242/107.6 X |
| 3,912,035 | 10/1975 | Ulert | 242/107.6 X |
| 3,917,019 | 11/1975 | Pearson et al. | 242/107.6 X |
| 4,534,441 | 8/1985 | Kamijo et al. | 242/107.6 X |

Primary Examiner—John M. Jillions
Attorney, Agent, or Firm—Tarolli, Sundheim & Covell

[57] ABSTRACT

A spindle has belt webbing wound on it. The spindle is supported for rotation in belt retraction and belt withdrawal directions. The spindle is biased to rotate in the belt retraction direction. A drive member has a longitudinal central axis and is movable in a direction along the axis from a first position to a second position. The drive member is disposed in a coaxial telescoping relationship with a rotatable driven member. A drive portion of the drive member engages a surface on the driven member to rotate the driven member in response to movement of the drive member to the second position. Rotation of the driven member causes the spindle to rotate in the belt withdrawal direction and pay out belt webbing to establish slack in the belt webbing. A notch on the driven member receives the drive portion of the drive member to block rotation of the driven member, thereby blocking rotation of the spindle in the belt retraction direction to maintain slack in the belt webbing.

16 Claims, 6 Drawing Sheets

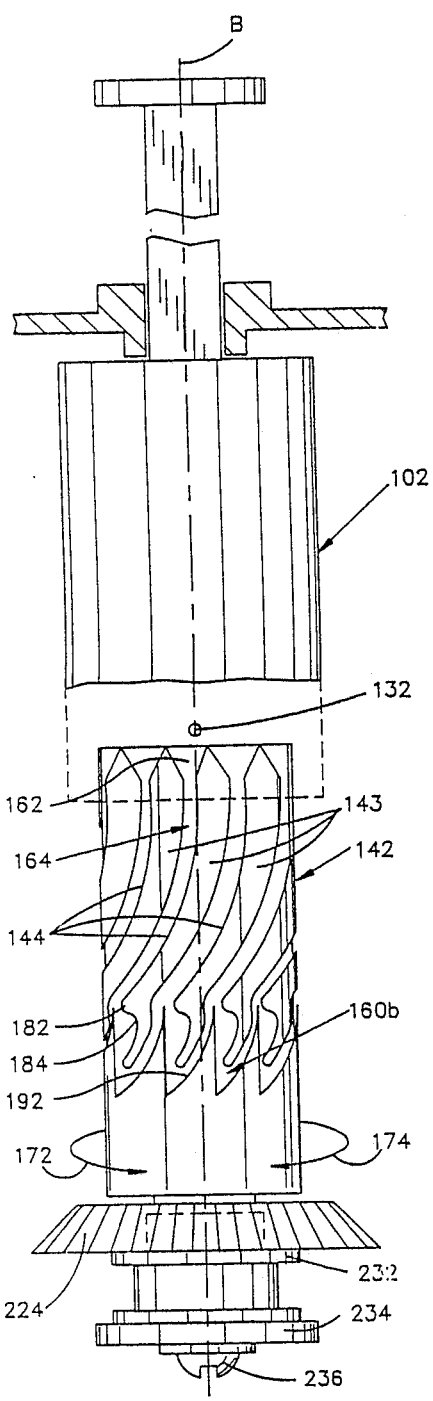
FIG. 2
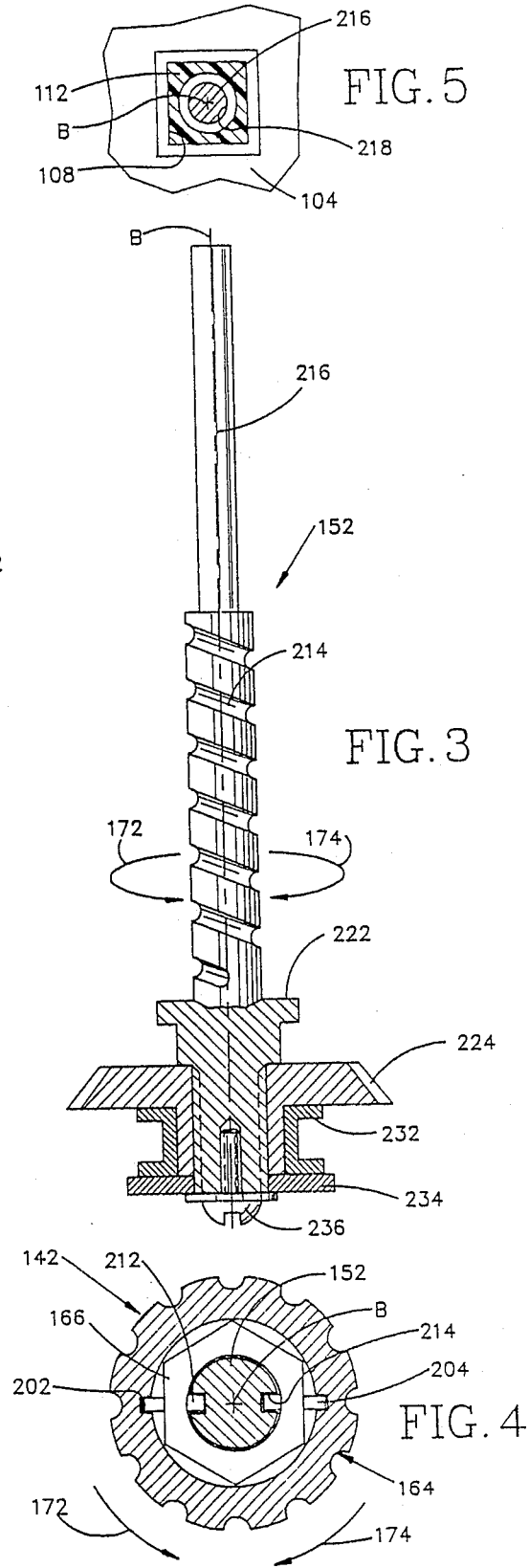
FIG. 5
FIG. 3
FIG. 4

COMFORT MECHANISM WITH SLACK SET AND MEMORY

BACKGROUND OF THE INVENTION

1. Technical Field

The present invention relates to a seat belt retractor for use in a vehicle. In particular, the present invention relates to a seat belt retractor having a comfort mechanism for relieving the force applied by seat belt webbing against a vehicle occupant.

2. Description of the Prior Art

Seat belt retractors having comfort mechanisms for relieving the force applied by seat belt webbing against a vehicle occupant are known. One such seat belt retractor is disclosed in U.S. Pat. No. 3,682,412 and includes seat belt webbing secured to a spool. The spool is supported for rotation in belt retraction and belt withdrawal directions for winding the seat belt webbing onto or off of the spool. A spring biases the spool to rotate in the belt retraction direction. After the seat belt webbing is buckled around the occupant, the biasing force of the spring pulls the seat belt webbing against the occupant.

To relieve the force of the seat belt webbing acting against the occupant, the retractor includes a comfort mechanism. The comfort mechanism disclosed in U.S. Pat. No. 3,682,412 is manually actuatable. After the seat belt webbing is buckled around the occupant, the occupant withdraws the seat belt webbing a relatively small amount to establish slack in the seat belt webbing. The occupant then manually moves a handle which actuates the comfort mechanism. Rotation of the spool in the belt retraction direction is then blocked and the slack established by the occupant is maintained. During a nonemergency situation, additional seat belt webbing in excess of the slack may be withdrawn from the spool during forward movement of the occupant. When the occupant moves back, the biasing spring rotates the spool in the belt retraction direction. The retractor has a "memory" to re-establish the amount of slack set in the belt webbing by the occupant.

SUMMARY OF THE INVENTION

The present invention is directed to a seat belt retractor with a comfort mechanism. The comfort mechanism includes a button which is manually engageable and moves between first and second positions to actuate the comfort mechanism. When the button is moved from the first position to the second position (i) the retractor spindle rotates in a direction to pay out seat belt webbing to establish a predetermined amount of slack and (ii) the comfort mechanism blocks the spindle from rotating in a belt retraction direction to maintain slack in the belt webbing. The comfort mechanism also has a "memory" to re-establish the slack after seat belt webbing in excess of the slack is withdrawn from the spindle.

The seat belt retractor according to the present invention has a spindle which is spring biased to rotate in a belt retraction direction. The spindle rotates in a belt withdrawal direction against the spring bias in response to actuation of the comfort mechanism, which rotates a driven member. The driven member is tubular and has a surface which extends at an acute angle relative to the longitudinal central axis of the driven member. A movable drive member is disposed in a telescoping relationship with the driven member. The drive member, which is blocked from rotating, includes the manually engageable button. Thus, movement of the button from its first position to its second position moves the drive member from a first position to a second position. A drive portion of the drive member engages the surface on the driven member to rotate the driven member in one direction in response to movement of the drive member to the second position. Rotation of the driven member in the one direction causes the spindle to rotate in the belt withdrawal direction and pay out seat belt webbing to establish a predetermined amount of slack in the belt webbing.

After slack is established in the belt webbing, the drive portion of the drive member engages a surface defining a notch on the driven member and blocks rotation of the driven member resulting from the spring bias. Since rotation of the driven member is blocked, rotation of the spindle is blocked. Thus, after slack in the belt webbing is established, rotation of the spindle in the belt retraction direction is blocked so that slack in the belt webbing is maintained.

In the event the occupant moves from an initial position to an extent such that all of the slack is taken up, additional belt webbing can be withdrawn from the retractor. The comfort mechanism has a "memory" for re-establishing the slack in the belt webbing when the occupant returns to the initial position. For this purpose, the comfort mechanism includes a shaft supported for rotation with the spindle. The shaft is disposed in a coaxial relationship within the driven member. A connecting member has a portion for engaging a helical groove on the shaft and moves along the shaft upon rotation of the shaft. The connecting member is held from rotating by projections which extend from the connecting member into axial grooves in an interior surface of the driven member. The connecting member is axially movable within the driven member upon rotation of the shaft.

When the slack in the belt webbing is established, the connecting member engages a flange on the shaft. If additional belt webbing in excess of the established slack is withdrawn from the spindle, the connecting member moves along the shaft in a first direction away from the flange on the shaft during rotation of the shaft in response to rotation of the spindle in the belt withdrawal direction. The connecting member moves along the shaft in a second direction toward the flange during rotation of the shaft in response to rotation of the spindle in the belt retraction direction, as when the occupant returns to the initial position. When the connecting member engages the flange, relative rotation between the shaft and the driven member is blocked and rotation of the spindle in the belt retraction direction is also blocked. Thus, the slack in the belt webbing is re-established.

In one embodiment of the present invention, the comfort mechanism is deactuated by moving the drive member axially relative to the driven member to disengage the drive portion of the drive member from the notch on the driven member. In another embodiment of the present invention, a release mechanism is provided to deactuate the comfort mechanism associated with a spindle for shoulder belt webbing in response to winding a predetermined amount of lap belt webbing on a spindle for lap belt webbing. The release mechanism includes an arm which carries the drive portion of the drive member. The arm is supported for pivotal movement by the drive member. The arm pivots in a direction away from the drive member when the predetermined amount of lap belt webbing has been wound onto the lap belt webbing spindle to disengage the drive portion from the surface defining the notch on the driven member. The driven member and shoulder belt webbing spindle then rotate in the belt retraction direction.

BRIEF DESCRIPTION OF THE DRAWINGS

Further features of the present invention will become apparent to those skilled in the art to which the present invention relates from reading the following specification with reference to the accompanying drawings, in which:

FIG. 2 is a view of the retractor in FIG. 1 with parts removed, taken approximately along line 2—2 of FIG. 1;

FIG. 3 is a view, partly in section, of a shaft and gear of the retractor of FIG. 1;

FIG. 4 is a cross sectional view of a portion of the retractor of FIG. 1 taken approximately along line 4—4 of FIG. 1;

FIG. 5 is a view, partly in section, of a portion of the retractor of FIG. 1 taken approximately along line 5—5 of FIG. 1;

DESCRIPTION OF PREFERRED EMBODIMENTS

Figure 1:
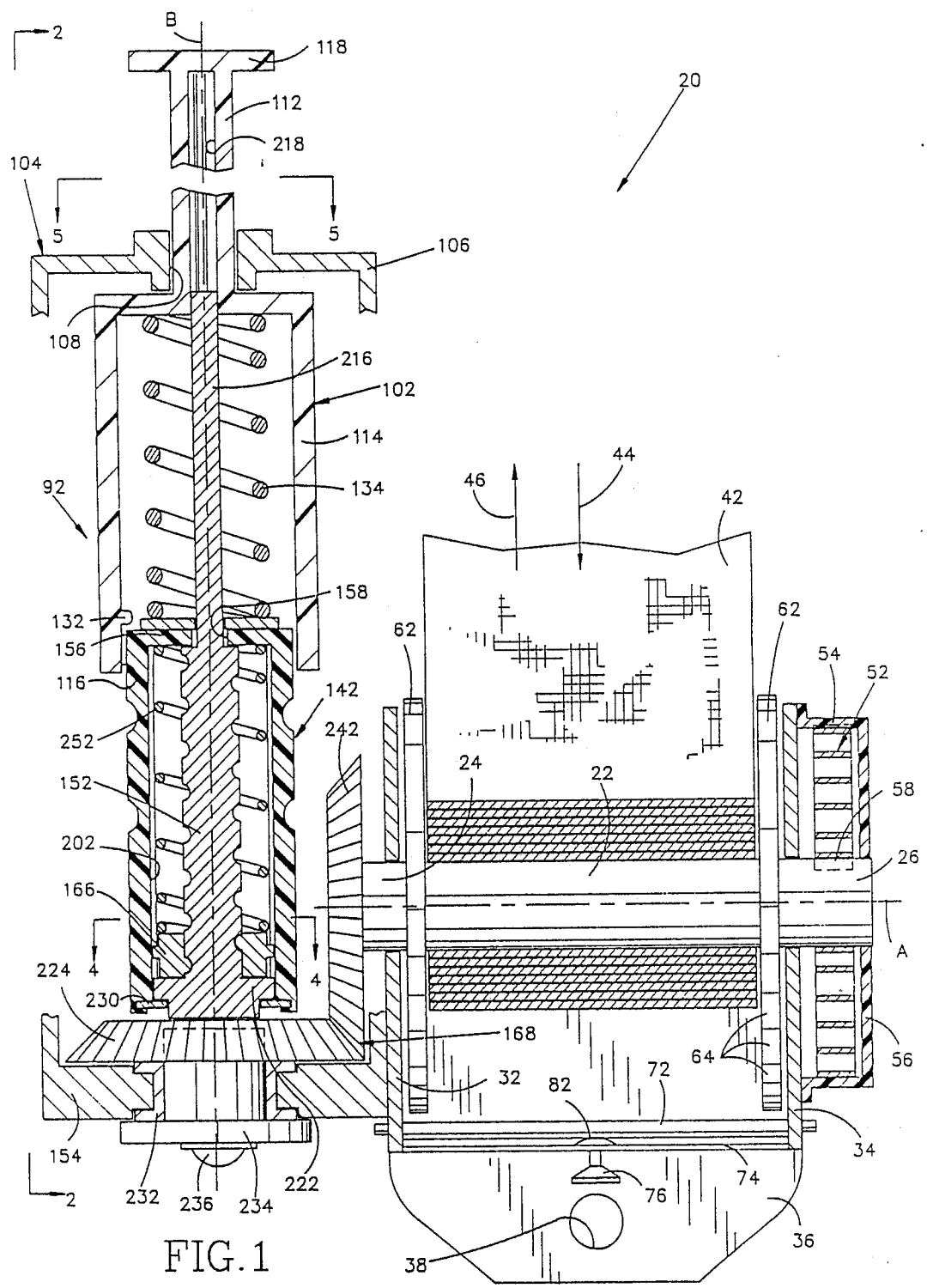
FIG. 1 is a view, partly in section, of one embodiment of a seat belt retractor of the present invention.

A seat belt retractor 20 for use in an automotive vehicle is illustrated in FIG. 1. The seat belt retractor 20 includes a spool or spindle 22 having a longitudinal central axis A. A pair of stub shafts 24, 26 are connected to the spindle 22 and extend from axially opposite ends of the spindle. Each of the stub shafts 24, 26 is supported in an opening in a respective side 32, 34 of a frame 36 and is rotatable relative to the frame 36. A suitable fastener (not shown) extends through an opening 38 in the frame 36 to connect the retractor 20 to the vehicle, as is known.

Seat belt webbing 42 is connected at one end to the spindle 22. The spindle 22 is rotatable about the longitudinal central axis A in a belt retraction direction when the belt webbing 42 is wound in the direction indicated by the arrow 44 onto the spindle for storage. The spindle 22 is also rotatable in a belt withdrawal direction when the belt webbing 42 is unwound in the direction indicated by the arrow 46 from the spindle.

A spring 52 biases the spindle 22 to rotate in the belt retraction direction. The spring 52 has one end portion 54 connected to a spring cover 56 which is attached to the frame side 34. The other end portion 58 of the spring 52 is connected to the stub shaft 26.

A pair of ratchet wheels 62 are connected to axially opposite end portions of the spindle 22. Each of the ratchet wheels 62 is located adjacent a respective frame side 32, 34. A plurality of ratchet teeth 64 extend radially outwardly from each ratchet wheel 62 and are equally spaced about the outer periphery of the ratchet wheel. A pawl 72 is supported for pivotal movement by the frame sides 32, 34. A beam 74 extends between the frame sides 32, 34 adjacent the pawl 72. A pendulum-type inertia member 76 is supported for pivotal movement by the beam 74.

The inertia member 76 pivots relative to the beam 74 in response to acceleration or deceleration of the vehicle at a rate above a predetermined rate, as is known. Upon pivotal movement of the inertia member 76, an upper portion 82 of the inertia member engages the pawl 72 and pivots the pawl toward the ratchet wheels 62. The pawl 72 then engages ratchet teeth 64 on the respective ratchet wheels 62 to block the spindle 22 from rotating in the belt withdrawal direction.

Once the belt webbing 42 is initially extended around the occupant and buckled, the spring 52 pulls the belt webbing 42 against the occupant. To relieve the force of the belt acting against the occupant, a comfort mechanism 92 is actuated to pay out the belt webbing 42 and establish a predetermined amount of slack (preferably not more than one inch) in the belt webbing. After the slack is established in the belt webbing 42, the comfort mechanism 92 blocks rotation of the spindle 22 in the belt retraction direction to maintain the slack.

The comfort mechanism 92 includes a drive member 102. The drive member 102 has a body portion 114 with a generally tubular configuration. The drive member 102 is movable in opposite directions along its longitudinal central axis B. The axis B of the drive member 102 extends in a direction substantially perpendicular to the longitudinal central axis A of the spindle 22. A stem portion 112 of the drive member 102 extends from the upper end of the body portion 114 through an opening 108 in an upper portion 106 of a housing 104. The housing 104 is connected to the side 32 of the retractor frame 36. The opening 108 in the housing 104 is square, as shown in FIG. 5. The stem 112 has a square cross section which is slightly smaller than the opening 108 so the drive member 102 is restrained from rotating about the axis B. The drive member 102 has a button 118 fixed to the stem 112. The button 118 has a surface which is manually engageable to cause the drive member 102 to move axially downward along the axis B. Thus, the drive member 102 is axially movable along the axis B but is restrained from rotating about the axis B.

A drive projection 132 extends radially inwardly from the inner circumferential surface of the body 114 of the drive member 102. The drive projection 132 cooperates with a driven member 142. The driven member 142 is disposed at the lower end of the body 114 of the drive member 102 and is coaxial with the drive member 102 and the axis B. The driven member 142 has a generally tubular configuration with a radially extending upper end surface 156 and an open lower end, as shown in FIG. 1. The driven member 142 is supported for rotation about the axis B. As the drive member 102 moves axially down along the axis B, the drive member moves telescopically down over the driven member 142, which is received in an opening 116 at the lower end of the body 114 of the drive member.

A shaft 152 is supported by a lower portion 154 of the housing 104 and is disposed coaxially within the driven member 142. A circumferentially expandable clip 230 is received in a groove in the lower end portion of the driven member 142. The clip 230 engages the bottom surface of a flange 222 on the shaft 152 to retain the shaft 152 within the drive member 142. An upper rod portion 216 of the shaft 152 extends through an opening 158 in the end surface 156 of the driven member 142. The free end of the upper portion 216 of the shaft 152 is received in a bore 218 in the stem 112 of the drive member 102 to maintain the shaft and driven member 142 in a coaxial relationship with the drive member. A spring 134 is located between the upper end of the body 114 of the drive member 102 and the end surface 156 of the driven member 142 to bias the drive member upwardly, to the position illustrated in FIG. 1.

Alternating lands 143 and grooves 164 are spaced equally about the outer circumferential surface of the driven member 142. Each land 143 includes a helical upper front surface 144, a lower end portion 182, a surface defining notch 184, and a back surface 196. Each of the surfaces 144 extends at an acute angle relative to the axis B and partially defines a groove 164. When the drive member 102 moves downwardly from an initial position, as viewed in FIG. 2, the projection 132 enters an upper portion 162 of a groove 164 and moves in a direction parallel to the axis B. The projection 132 engages the surface 144 and upon further downward movement of the drive member 102 causes the driven member 142 to rotate in a counterclockwise direction 172, as viewed in FIG. 4, a predetermined angular amount.

The driven member 142 is connected with the spindle 22 through the shaft 152, a connecting member 166 (FIG. 1) and a gear set 168. The driven member 142 is connected with the shaft 152 by the connecting member 166. The driven member 142 has a pair of diametrically opposed axially extending grooves 202 in its inner circumferential surface. The connecting member 166 has diametrically opposed and radially outwardly extending projections 204 (FIG. 4). The projections 204 are received in the axial grooves 202 in the driven member 142. The grooves 202 and projections 204 permit the connecting member 166 to move axially along the shaft 152 and prevent relative rotation between the driven member 142 and connecting member 166.

The connecting member 166 also has a pair of diametrically opposed and radially inwardly extending projections 212. The projections 212 are received in a helical groove 214 (FIG. 3) on the shaft 152. The helical groove 214 is opposite-handed relative to the surfaces 144 on the driven member 142. The connecting member 166 is driven downwardly, as viewed in FIG. 1, along the shaft 152 when the shaft rotates in the counterclockwise direction 172 about the axis B. The connecting member 166 is driven upwardly along the shaft 152 when the shaft 152 rotates in a clockwise direction 174 about the axis B.

The connecting member 166 is biased by a spring 252 (FIG. 1) toward the flange 222 on the bottom of shaft 152. When the connecting member 166 engages the upper surface of the flange 222 and the driven member 142 rotates in the direction 172 or the shaft 152 rotates in the direction 174, the shaft 152 and the driven member 142 are connected together for joint rotation by connecting member 166. When the connecting member 166 does not engage the flange 222 on the shaft 152, the driven member 142 and shaft may rotate relative to one another.

The gear set 168 includes a gear 224 (FIG. 3) fixed to the shaft 152. A bearing 232 is disposed around an axially projecting portion of the gear 224. A washer 234 fastened by a screw 236 to the shaft 152 retains the bearing 232 on the shaft. The bearing 232 engages the lower portion 154 (FIG. 1) of the housing 104 to support the gear 224, the shaft 152, and the driven member 142 for rotation about the axis B. Another gear 242 of the gear set 168 is fixed to the stub shaft 24. The gear 242 is in meshing engagement with the gear 224. Thus, when the spindle 22 rotates, the gears 224, 242 cause the shaft 152 to rotate about the axis B.

Figure 6:
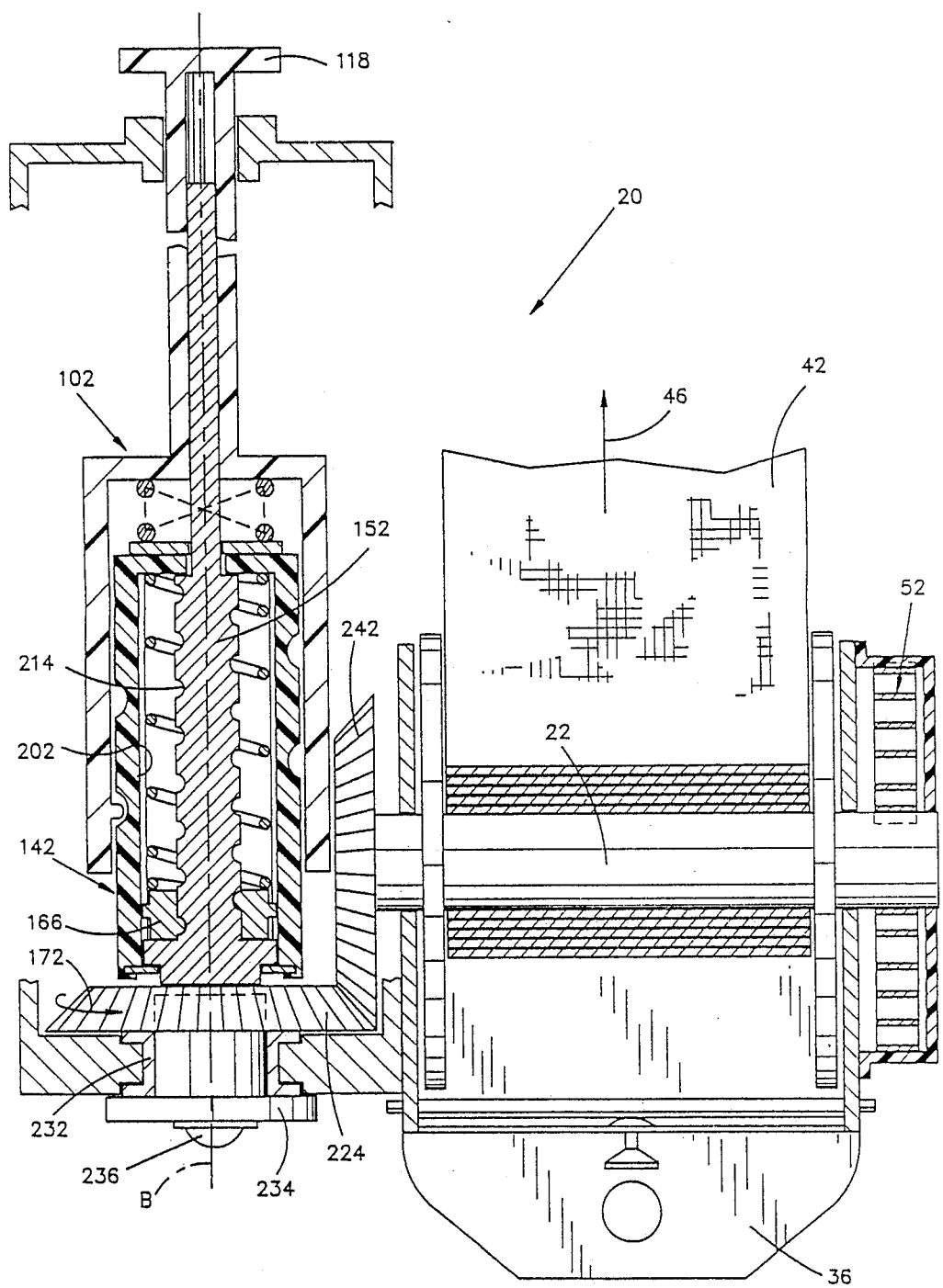
FIGS. 6 and 7 are views similar to FIG. 1 illustrating parts in different positions.

When the drive member 102 moves from the position illustrated in FIG. 1 to the position illustrated in FIG. 6, the drive projection 132 engages a surface 144 and rotates the driven member 142 in the counterclockwise direction 172. Since the spring 252 biases the connecting member 166 against the flange 222, a driving connection is established between the driven member 142 and shaft 152 to rotate the shaft 152 in the direction 172. The shaft 152, in turn, rotates the gear 224 in the direction 172 about the axis B. The gear 224 rotates the gear 242 and the spindle 22 in the belt withdrawal direction against the biasing force of the spring 52 to pay out a predetermined amount of belt webbing 42. This establishes slack in the belt webbing 42. The amount of rotation of the driven member 142 preferably establishes approximately one inch of slack in the belt webbing 42.

Figure 8:
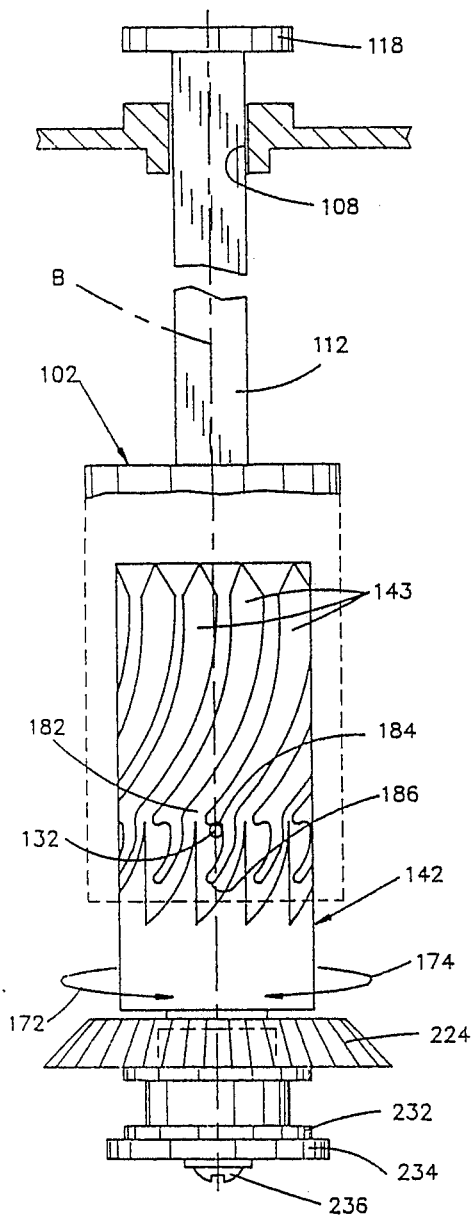
FIGS. 8 and 9 are views similar to FIG. 2 illustrating parts in different positions.

The driven member 142 is biased to rotate about the axis B in the clockwise direction 174, as viewed in FIG. 4, due to the force of the spring 52 attempting to rotate the spindle 22, gears 224, 242, shaft 152 and connecting member 166. When the drive member 102 moves downwardly, as viewed in FIGS. 1 and 2, the projection 132 can move beyond the lower end portion 182 (FIG. 2) of the surface 144. The driven member 142 will then rotate in the direction 174 due to the bias of the spring 52, and the projection 132 will engage the surface defining the notch 184, as illustrated in FIG. 8. When the projection 132 engages the notch 184, the driven member 142 is blocked from rotating in the direction 174 and the spindle 22 is blocked from rotating in the belt retraction direction. The comfort mechanism 92 also maintains slack in the belt webbing 42, and the force of the belt webbing acting on the occupant is relieved.

Figure 7:
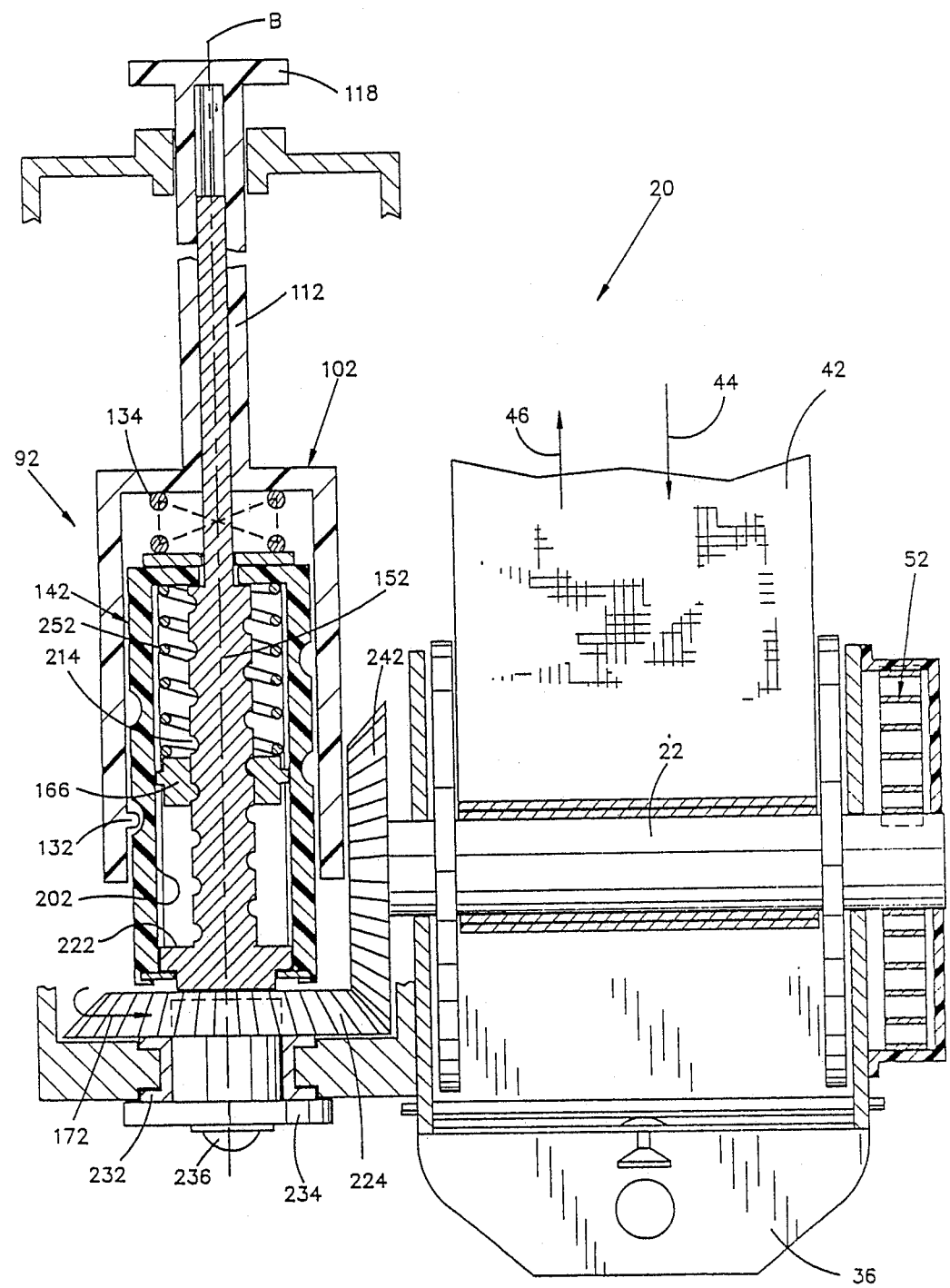

After the comfort mechanism 92 is actuated in the manner described above, the occupant may move forward from his initial position, such as against the seat back, and take up the slack. Further movement of the occupant will cause the belt webbing 42 to be withdrawn from the retractor 20 and the spindle 22 to rotate in the belt withdrawal direction. As the spindle 22 rotates in the belt withdrawal direction, the gears 224, 242 also rotate and cause the shaft 152 to rotate in the direction 172 (FIG. 4) about the axis B. During rotation of the shaft 152 in direction 172, the helical groove 214 drives the connecting member 166 upwardly to a position as illustrated in FIG. 7.

As the connecting member 166 moves upwardly, it slides along the grooves 202 in the driven member 142 without rotating the driven member. In addition, the driven member 142 is held from rotating by the drive member 102 and the projection 132 which is engaging the notch 184. The extent to which the connecting member 166 can move axially along the shaft 152 determines the amount of belt webbing 42 which can be withdrawn from the spindle 22. The maximum amount of axial movement of the connecting member 166 along the shaft 152 is determined by the length of the helical groove 214, the length of the driven member 142 and the length of the spring 252 when it is completely compressed. Preferably, the parts are constructed so the entire length of belt webbing 42 can be withdrawn from the spindle 22.

When the occupant returns to his initial position, such as against the seat back, the occupant no longer exerts a force causing the belt webbing 42 to extend or be withdrawn from the retractor 20. The spring 52 then rotates spindle 22 in the belt retraction direction. As the spindle 22 rotates in the belt retraction direction, the shaft 152 rotates in the direction 174. The connecting member 166 moves axially downward along the shaft 152, partly due to the biasing force of the spring 252 and partly due to the driving action of the helical groove 214 on the rotating shaft.

The connecting member 166 moves axially along the grooves 202 of the driven member 142 until the connecting member engages the flange 222, as viewed in FIG. 6, thereby preventing any further rotation of the shaft 152. Rotation of the spindle 22 in the belt retraction direction is, thus, blocked. When the connecting member 166 engages the flange 222, the amount of slack initially established in the belt webbing 42 is re-established. Thus, the comfort mechanism 92 has a "memory".

Figure 9:
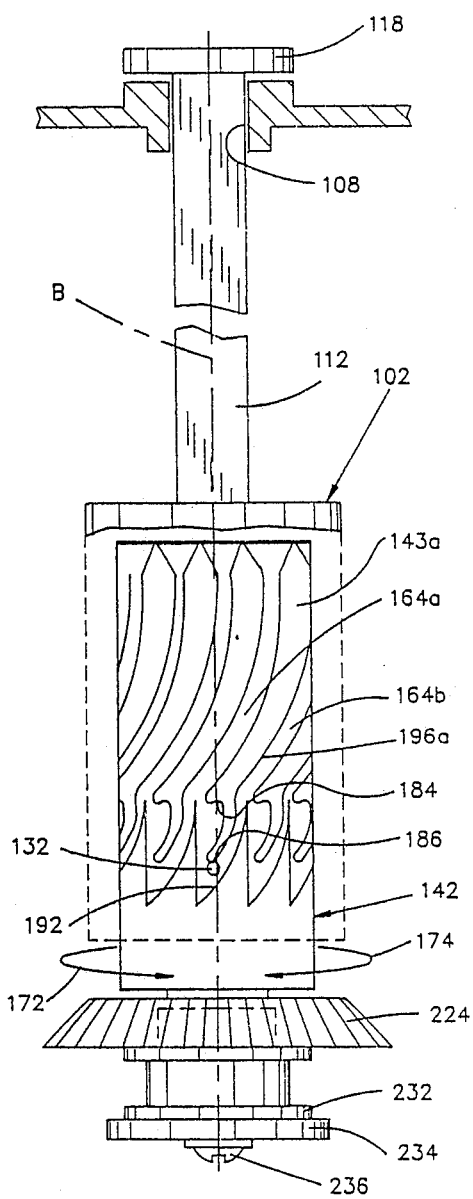

In order to deactuate the comfort mechanism 92, the occupant merely depresses the button 118 of the drive member 102 to move the drive member downwardly from the position of FIG. 8 to the position of FIG. 9. The projection 132 on the drive member 102 moves in a direction parallel to the axis B below the end 186 of the notch surface 184 of land 143a, as viewed in FIG. 9. At the same time, the return spring 52 urges the driven member 142 to rotate in the direction 174. The projection 132 then engages a surface 192 that defines the bottom of the next adjacent groove 164b and rides upwardly along the back surface 196a of the land 143a under the biasing action of the spring 134, which biases the drive member 102 upwardly as the force on the button 118 is released. The slack is taken up and the belt webbing 42 is pulled against the occupant by the force of the spring 52 rotating the spindle 22 in the belt retraction direction. The comfort mechanism is, thus, deactuated.

Figure 10:
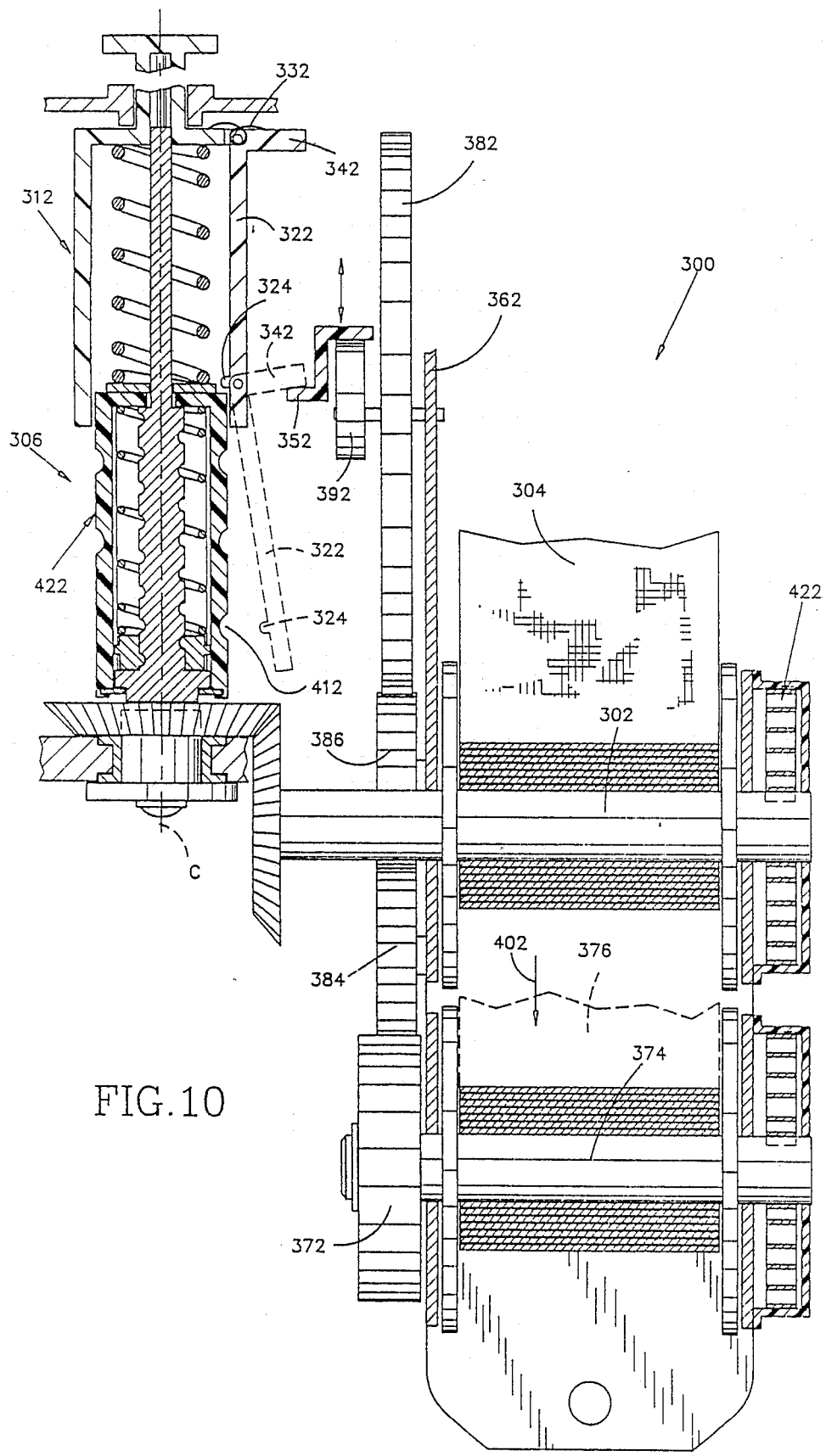
FIG. 10 is a view, partly in section, of another embodiment of a seat belt retractor of the present invention.

FIG. 10 illustrates an alternate embodiment for deactuating a seat belt retractor in accordance with the present invention. In FIG. 10, a dual spool retractor 300 includes an upper spool or spindle 302 on which shoulder belt webbing 304 is wound. Associated with the upper spindle 302 is a comfort mechanism 306 identical to the comfort mechanism 92 described above with the exception that the drive member 312 carries an arm 322 for pivotal movement.

A drive projection 324 is supported by the arm 322. The arm 322 is biased by a spring 332 to the position illustrated in solid lines in FIG. 10. When the drive member 312 is depressed to actuate the comfort mechanism 306, an upper portion 342 of the arm 322 is adjacent a pull off mechanism 352. The pull off mechanism 352 is supported for reciprocal movement by a housing 362.

A gear 372 is connected to a lower spindle 374 for rotation with the spindle. Lap belt webbing 376 is wound on the lower spindle 374. Another gear 382 having a larger diameter than the gear 372 is supported for rotation by the housing 362. Idler gears 384, 386 are supported between the gears 372, 382 and rotate the gear 382 in response to rotation of gear 372. A cam 392 is connected to the gear 382 for rotation with the gear 382.

When the spindle 374 has rotated a predetermined number of turns in the belt retraction direction 402, the cam 392 engages the pull off mechanism 352 and moves the pull off mechanism upwardly, as viewed in FIG. 10. The pull off mechanism 352 engages the portion 342 of the arm 322 and pivots the arm to the position illustrated in dashed lines in FIG. 10. This removes the drive projection 324 from the surface defining the notch 412 in the driven member 422. Therefore, the driven member 422 is no longer restrained from rotation about the axis C. The comfort mechanism 306 is deactuated and the shoulder belt webbing 304 retracts onto the spindle 302 under the bias force of a return spring 422.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. An apparatus comprising:
   a spindle having belt webbing wound thereon, said spindle being supported for rotation in belt retraction and belt withdrawal directions;
   means biasing said spindle to rotate in the belt retraction direction;
   a rotatable driven member having a cam surface;
   means for rotating said spindle in response to rotation of said driven member; and
   a drive member having a longitudinal central axis and being movable in a direction along the longitudinal central axis from a first position to a second position, said drive member being disposed in a coaxial telescoping relationship with said driven member and having a drive portion for engaging said cam surface on said driven member to rotate said driven member in response to movement of said drive member to the second position to cause said spindle to rotate in the belt withdrawal direction against said biasing means and pay out a predetermined amount of belt webbing thereby establishing slack in the belt webbing.

2. The apparatus set forth in claim 1 further including means for blocking rotation of said spindle in the belt retraction direction after the predetermined amount of belt webbing has been paid out to maintain the slack established in the belt webbing.

3. The apparatus set forth in claim 2 wherein said blocking means includes (a) a housing having a surface defining an opening for receiving a portion of said drive member to prevent rotation of said drive member and (b) a surface defining a notch on said driven member located adjacent an end of said cam surface for engaging said drive portion of said drive member to prevent rotation of said driven member relative to said drive member.

4. The apparatus set forth in claim 1 wherein said cam surface on said driven member extends at an acute angle relative to the longitudinal central axis of said drive member, and said drive member further includes a surface which is manually engageable for manually moving said drive member in a direction along its longitudinal central axis to the second position.

5. The apparatus set forth in claim 4 wherein the longitudinal central axis of said drive member extends in a direction transverse to the longitudinal central axis of said spindle.

6. The apparatus set forth in claim 1 wherein said means for rotating said spindle includes a shaft connected to said driven member for rotation with said driven member and a gear train connected between said shaft and said spindle, said shaft being disposed coaxially within said driven member.

7. An apparatus comprising:
a spindle having belt webbing wound thereon, said spindle being supported for rotation in belt retraction and belt withdrawal directions;
biasing means for biasing said spindle to rotate in the belt retraction direction;
means for blocking rotation of said spindle in the belt retraction direction after slack in the belt webbing is established, for permitting the withdrawal of the belt webbing in excess of the slack and for thereafter re-establishing the slack, said means comprising:
a shaft supported for rotation with said spindle, said shaft having a flange portion and a helical groove; and
a connecting member having a portion for being received in said helical groove of said shaft and a surface for engaging said flange portion of said shaft;
said connecting member being movable along said shaft in a first direction away from said flange portion during rotation of said shaft in response to rotation of said spindle in the belt withdrawal direction and along said shaft in a second opposite direction toward said flange portion during rotation of said shaft in response to rotation of said spindle in the belt retraction direction, movement of said connecting member in said second direction being blocked when said surface of said connecting member engages said flange portion of said shaft.

8. The apparatus set forth in claim 7 further including means biasing said connecting member in the second direction toward said flange portion of said shaft.

9. The apparatus set forth in claim 7 further including a driven member, means for blocking rotation of said driven member and a projection extending radially from said connecting member, said driven member having an axially extending groove for receiving said projection of said connecting member to permit movement of said connecting member along said shaft and to prevent rotational movement of said connecting member about said shaft when said connecting member engages said flange portion of said shaft.

10. The apparatus set forth in claim 9 wherein said means for blocking rotation of said driven member includes a surface defining a notch on said driven member, a movable drive member having a projection for engaging said surface defining the notch on said driven member and a housing having a surface defining an opening for receiving portion of said drive member to prevent rotation of said drive member and thereby block rotation of said driven member when said projection of said drive member engages said surface defining the notch on said driven member.

11. The apparatus set forth in claim 10 wherein said drive member is disposed in a coaxial telescoping relation with said driven member and has a surface which is manually engageable for manually moving said drive member to a position in which said projection of said drive member engages said surface defining the notch on said driven member.

12. The apparatus set forth in claim 11 further including means for establishing slack in the belt webbing including a cam surface on said driven member extending at an acute angle relative to the longitudinal central axis of said driven member, said projection of said drive member being engageable with said cam surface to rotate said driven member in response to movement of said drive member in one direction for rotating said spindle against said biasing means in the belt withdrawal direction to pay out a predetermined amount of belt webbing.

13. The apparatus set forth in claim 10 further including means for disabling said means for blocking rotation of said spindle in the belt retraction direction.

14. The apparatus set forth in claim 13 wherein said disabling means comprises:
a second spindle having second belt webbing wound thereon, said second spindle being supported for rotation in belt retraction and belt withdrawal directions;
an arm portion supported for pivotal movement by said drive member, said arm carrying said projection of said drive member; and
means for pivoting said arm to a position in which said projection disengages said surface defining the notch on said driven member in response to a predetermined amount of second belt webbing being wound onto said second spindle during rotation of said second spindle in the belt retraction direction.

15. The apparatus set forth in claim 14 wherein said pivoting means comprises a movable second member having a portion for engaging said arm, a cam rotatable with said spindle for moving said second member to a position in which said portion of said second member engages said arm to pivot said arm to the position in which said projection disengages said surface defining the notch on said driven member.

16. An apparatus comprising:
a spindle having belt webbing wound thereon, said spindle being supported for rotation in retraction and withdrawal directions;
means biasing said spindle to rotate in the retraction direction;
a rotatable driven member having a cam surface;
means for rotating said spindle in response to rotation of said driven member; and
a drive member having a longitudinal central axis and being movable in a direction along the longitudinal central axis from a first position to a second position, said drive member being disposed in a coaxial telescoping relationship with said driven member and having a drive portion for engaging said cam surface on said driven member to rotate said driven member in response to movement of said drive member to the second position to cause said spindle to rotate in the withdrawal direction against said biasing means to pay out a predetermined amount of belt webbing for establishing slack in the belt webbing; and
means for blocking rotation of said spindle in the retraction direction after slack in the belt webbing is established, for permitting the withdrawal of the belt webbing in excess of the slack and for thereafter re-establishing the slack, said blocking means comprising:
means for blocking rotation of said driven member;
a shaft supported for rotation with said spindle and extending coaxially within said driven member, said shaft having a flange portion and a helical groove; and a connecting member having a first portion for being received in said helical groove of said shaft to move said member along said shaft and having a surface for engaging said flange portion of said shaft;

said connecting member being movable along said shaft in a first direction away from said flange portion during rotation of said shaft in response to rotation of said spindle in the withdrawal direction and along said shaft in a second opposite direction toward said flange portion during rotation of said shaft in response to rotation of said spindle in the retraction direction, movement of said connecting member in said second direction being blocked when said surface of said connecting member engages said flange portion of said shaft.

* * * * *